(12) United States Patent
Williams et al.

(10) Patent No.: US 8,019,879 B2
(45) Date of Patent: Sep. 13, 2011

(54) WIRELESS COMMUNICATIONS SYSTEMS AND WIRELESS COMMUNICATIONS METHODS

(75) Inventors: Brett Williams, Roseville, CA (US); Nathan Harmon, Roseville, CA (US); Duane Mentze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 164 days.

(21) Appl. No.: 12/388,448

(22) Filed: Feb. 18, 2009

(65) Prior Publication Data

US 2009/0154440 A1    Jun. 18, 2009

Related U.S. Application Data

(63) Continuation of application No. 10/703,862, filed on Nov. 7, 2003, now abandoned.

(51) Int. Cl.
 *G06F 13/00* (2006.01)
(52) U.S. Cl. .......................... 709/228; 709/219; 709/225
(58) Field of Classification Search .................. 709/217, 709/218, 219, 223, 225, 227, 228, 229
See application file for complete search history.

(56) References Cited

U.S. PATENT DOCUMENTS

| | | | |
|---|---|---|---|
| 5,291,543 A | 3/1994 | Freese et al. | |
| 5,768,695 A | 6/1998 | Fischer et al. | |
| 5,987,062 A | 11/1999 | Engwer et al. | |
| 6,069,887 A | 5/2000 | Geiger et al. | |
| 6,198,915 B1 | 3/2001 | Blakeney et al. | |
| 6,199,077 B1 | 3/2001 | Inala et al. | |
| 6,259,891 B1 | 7/2001 | Allen | |
| 6,311,054 B1 | 10/2001 | Korpela | |
| 6,529,728 B1 | 3/2003 | Pfeffer et al. | |
| 6,941,356 B2 | 9/2005 | Meyerson | |
| 6,961,762 B1 | 11/2005 | Yeap et al. | |
| 7,269,653 B2 | 9/2007 | Mentze et al. | |
| 7,313,384 B1* | 12/2007 | Meenan et al. | 455/410 |
| 7,346,344 B2* | 3/2008 | Fontaine | 455/418 |
| 2002/0176579 A1 | 11/2002 | Deshpande et al. | |
| 2003/0027549 A1 | 2/2003 | Kiel et al. | |
| 2003/0031188 A1* | 2/2003 | Ishibashi | 370/400 |
| 2003/0120920 A1 | 6/2003 | Svensson et al. | |
| 2003/0212768 A1* | 11/2003 | Sullivan | 709/220 |
| 2004/0059923 A1* | 3/2004 | ShamRao | 713/186 |
| 2004/0203581 A1 | 10/2004 | Sharon et al. | |
| 2004/0242197 A1 | 12/2004 | Fontaine | |

(Continued)

OTHER PUBLICATIONS

"HP Jetdirect 802.11b Print Servers—Wireless Security Concepts and Terminology"; http://h20015.www2.hp.com/en/document.jhtml?lc= en&docName=bpj0732.pdf; Jul. 10, 2003; 4 pp.
HP Jetdirect 802.11b Print Servers—Wireless Security Overview; http://h20015.www2.hp.com/en/document.jhtml?lc= en&docName= bpj07460.pdf; Jul. 10, 2003; 2 pp.

(Continued)

*Primary Examiner* — Viet Vu (57) ABSTRACT

Wireless network access methods, communication device configuration methods, configuration devices, communications systems, and articles of manufacture are described. According to one aspect, a wireless network access method includes providing a communications device, providing a wireless network including access to a service, storing wireless network access data and service access data using a configuration device, communicating the wireless network access data and the service access data to the communications device using the configuration device, communicating the wireless network access data to the wireless network using the communications device to establish the communications device as a node on the wireless network, communicating the service access data to the wireless network using the communications device, and accessing the service using the communications device responsive to the communicating the service access data.

20 Claims, 4 Drawing Sheets

U.S. PATENT DOCUMENTS

| | | |
|---|---|---|
| 2005/0005013 A1 | 1/2005 | Saint-Hilaire et al. |
| 2005/0059396 A1 | 3/2005 | Chuah et al. |
| 2005/0060532 A1 | 3/2005 | Dorenbosch et al. |
| 2005/0099977 A1 | 5/2005 | Williams et al. |
| 2005/0101293 A1 | 5/2005 | Mentze et al. |
| 2005/0101318 A1 | 5/2005 | Williams et al. |
| 2005/0102529 A1 | 5/2005 | Buddhikot et al. |

OTHER PUBLICATIONS

HP Jetdirect Administrators Manual; http://h20000.www2.hp.com/bc/docs/support/SupportManual/bpj07646/bpj07646-­ /bpj07646.pdf; Oct. 2002; pp. 256-261.

"Fascinator", http://webhome.idirect.com/-jproc/crypto/fascinator.html, 2 pages.

\* cited by examiner

WIRELESS COMMUNICATIONS SYSTEMS AND WIRELESS COMMUNICATIONS METHODS

RELATED PATENT DATA

The present application is a continuation of and claims priority to U.S. patent application Ser. No. 10/703,862 filed on Nov. 7, 2003 now abandoned, entitled "Wireless Network Access Methods, Communications Device Configuration Methods, Configuration Devices, Communications Systems, And Articles Of Manufacture", naming Brett Williams, Nathan Harmon, and Duane Mentz, as inventors, now abandoned, the disclosure of which is incorporated herein by reference.

CROSS REFERENCE TO RELATED APPLICATIONS

This application is related to copending U.S. Patent Application entitled "Wireless Network Communications Methods, Communications Device Operational Methods, Wireless Networks, Configuration Devices, Communications Systems, And Articles Of Manufacture" having Ser. No. 10/703,878, listing Brett Williams, Nathan Harmon, and Duane Mentze as inventors, and copending U.S. Patent Application entitled "Wireless Network Monitoring Methods, Configuration Devices, Communications Systems, And Articles Of Manufacture" having Ser. No. 10/703,877, listing Brett Williams, Nathan Harmon, and Duane Mentze as inventors, which were filed concurrently and which are incorporated by reference herein.

FIELD OF THE INVENTION

Aspects of the invention relate to wireless network access methods, communications device configuration methods, configuration devices, communications systems, and articles of manufacture.

BACKGROUND OF THE INVENTION

Computing devices, such as personal computers, pocket PCs and other devices, continue to be used in new processing and communications applications. For example, the increased processing speeds and computational power of these devices has greatly enhanced the popularity and usage of the devices. More recently, advancements in networking and other communications between computing devices has also experienced significant improvements. Computing devices now quickly and efficiently communicate with other devices including e-mail, browsing, and other communications.

Portable computing devices have also experienced significant growth in capabilities and popularity. Wireless local area networks, such as wireless fidelity (WiFi) networks, have been developed to enable users to wirelessly access and communicate with other networked devices, such as Internet devices and other devices coupled with local area networks. For example, 802.11b networks are being used in an increased number of applications and locations to provide electronic connectivity. Coverage of the wireless local area network may be referred to as a hotspot. Public wireless local area networks may provide communications in office locations, public places, or other applications wherein electronic communications are desired. For example, wireless local area networks are now utilized in airport terminals, coffeehouses, and other establishments, providing public and/or membership access to the wireless local area network, and perhaps the Internet for browsing and e-mail communications.

Some drawbacks have been experienced with respect to connecting devices to wireless local area networks. For example, to connect to some networks, a computing device may use appropriate connection information including a network name (e.g., SSID) and mode of operation. In addition, the device may need to be authenticated and use appropriate encryption to send and receive communications with respect to the wireless local area network. Other information may also be necessary to establish communications between a given computing device and a wireless local area network. Accordingly, a user would manually configure the appropriate parameters or settings to provide network access. Without appropriate configuration of the computing device, a user may be unable to access the wireless local area network. However, manual configuration may be difficult for some users, subject to user errors, etc.

In one example, a user may desire to access a hotspot service provider (e.g., t-mobile.com) to access the public Internet. The user may setup the device for wireless access, purchase time from the provider, provide a computer at the location of the hotspot and manually attempt to connect to the service. At least some users may have difficulty manually configuring their computer to access the service, and as a result, become frustrated and avoid using the service.

According to at least some embodiments of the disclosure, improved methods and apparatus of accessing wireless networks and/or services associated therewith are described.

SUMMARY OF THE INVENTION

Wireless network access methods, communications device configuration methods, configuration devices, communications systems, and articles of manufacture are described.

According to one aspect, a wireless network access method comprises providing a communications device, providing a wireless network including access to a service, storing wireless network access data and service access data using a configuration device, communicating the wireless network access data and the service access data to the communications device using the configuration device, communicating the wireless network access data to the wireless network using the communications device to establish the communications device as a node on the wireless network, communicating the service access data to the wireless network using the communications device, and accessing the service using the communications device responsive to the communicating the service access data.

According to another aspect, a communications device configuration method comprises providing a communications device configured to implement wireless communications, providing a configuration device comprising wireless network access data for a respective wireless network and service access data for a service accessible using the wireless network, communicating the wireless network access data from the configuration device to the communications device to configure the communications device to access the respective wireless network, and communicating the service access data from the configuration device to the communications device to configure the communications device to access the service via communications using the wireless network.

According to a further aspect, a configuration device comprises a communications interface configured to implement electronic communications of the configuration device with an external device which is externally located with respect to the configuration device, a storage device configured to store wireless network access data and service access data and to output the wireless network access data and service access data to the communications interface for communication externally of the configuration device to the external device using the communications interface, and wherein the wireless network access data comprises information enabling the external device to access and to implement communications with a respective wireless network, and the service access data comprises information enabling the external device to access a service associated with wireless network and configured to perform an action with respect to the external device responsive to a command from the external device.

Other aspects are disclosed as is apparent from the following description.

DETAILED DESCRIPTION OF THE INVENTION

Figure 1:
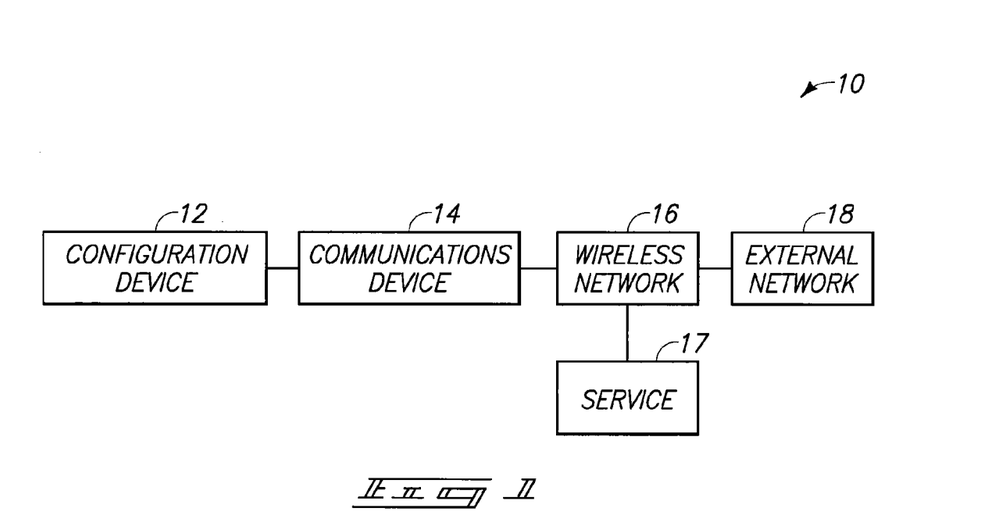
FIG. 1 is a functional block diagram illustrating a communications system according to one embodiment.

Referring to FIG. 1, an exemplary communications system 10 is shown. The depicted components of communications system 10 are configured to electronically communicate with another. The illustrated communications system 10 includes a configuration device 12, a communications device 14, a wireless network 16, a service 17, and an external network 18. Other configurations of system 10 are possible in other embodiments. For example, external network 18 may be omitted in at least one other embodiment.

Configuration device 12 operates to configure communications device 14 in one embodiment. In exemplary aspects, configuration device 12 configures communications device 14 to communicate with wireless network 16 and/or access service 17 associated with the wireless network 16. Exemplary services 17 are described below.

Communications device 14 is arranged by configuration device 12 to communicate with wireless network 16 and access one or more service 17 associated therewith. Exemplary configurations of communications device 14 include a personal computer (PC) or pocket PC (e.g., iPAQ available from the Hewlett-Packard Company). Other embodiments of communications device 14 are possible. For example, communications device 14 may be arranged as any electrical device configured to implement wireless communications. Communications device 14 may include computational or data processing capabilities in some embodiments.

Wireless network 16 is configured to implement wireless communications with at least some devices or networks coupled with the network 16. Wireless network 16 may also provide wired connectivity to one or more devices or networks coupled therewith. An exemplary arrangement of wireless network 16 comprises a wireless local area network, such as a 802.11b network, in one example. Wireless network 16 is configured to provide access between communications device 14 and service 17 associated with wireless network 16. Wireless network 16 may comprise a public wireless network and be referred to as a hotspot.

Service 17 is associated with wireless network 16 in the depicted example. As shown, service 17 is directly coupled with wireless network 16 in one embodiment. Service 17 may also be coupled with external network 18 and accessible using wireless network 16 and external network 18.

Service 17 performs electronic actions with respect to communications device 14 in at least one example. For example, service 17 may perform desired actions responsive to commands, requests, or other communications originating from communications device 14. Service 17 may be tailored to the location and application of the wireless network 16. One example of service 17 includes a hotspot service provider for exemplary embodiments wherein wireless network 16 provides public communications in an airport terminal, coffeehouse, or other location. Another example of service 17 includes managing image forming devices (e.g., printers) available on the wireless network 16. Another possible service 17 includes accessing services of a library via wireless network 16. The described services 17 are exemplary and provision of other electrical actions may be performed by service 17 with respect to communications device 14 in other embodiments.

External network 18 is coupled with wireless network 16. Communications device 14 may access external network 18 via wireless network 16 in the depicted example. One embodiment of external network 18 comprises the public Internet. Other arrangements of external network 18 are possible and may include wireless and/or wired components. As mentioned previously, communications device 14 may desire to access a service 17 coupled with external network 18.

Figure 2:
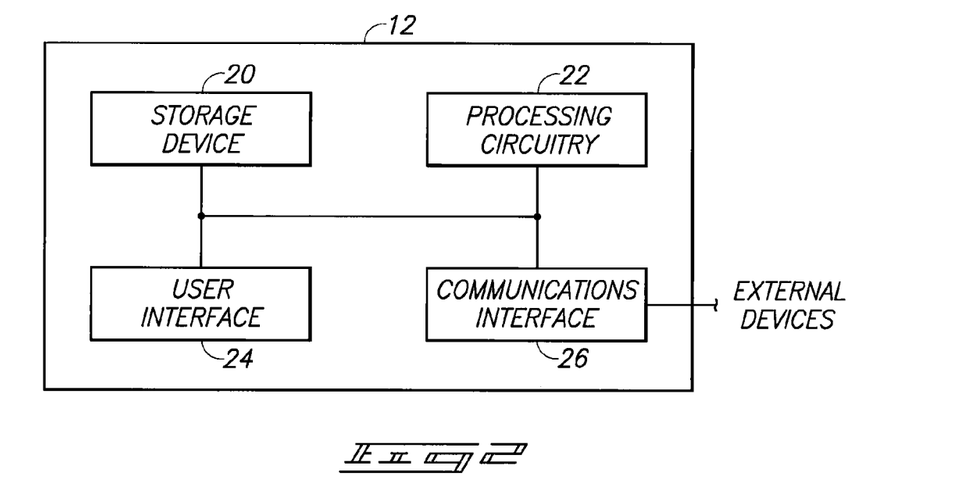
FIG. 2 is a functional block diagram illustrating hardware components of a configuration device or a communications device according to illustrative exemplary embodiments.

Referring to FIG. 2, an exemplary arrangement of configuration device 12 is shown. The depicted arrangement may also correspond to one embodiment of communications device 14. The illustrated configuration device 12 includes a storage device 20, processing circuitry 22, user interface 24, and communications interface 26.

Configuration device 12 (or communications device 14) may include more, less, or alternative components. For example, for configuration device embodiments, the processing circuitry 22 and/or user interface 24 may be omitted.

Storage device 20 is configured to store electronic data and/or programming such as executable instructions (e.g., software and/or firmware), data, or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

In one embodiment, processing circuitry 22 may comprise circuitry configured to implement desired programming. For example, the processing circuitry 22 may be implemented as a processor or other structure configured to execute executable instructions including, for example, software and/or firmware instructions. Other exemplary embodiments of processing circuitry 22 include hardware logic, PGA, FPGA, ASIC, and/or other structures. These examples of processing circuitry 22 are for illustration and other configurations are possible.

User interface 24 may be embodied as any appropriate apparatus configured to display or convey user information and/or receive user input. Exemplary embodiments of user interface 24 comprise a display, speaker, keyboard, mouse, etc.

Communications interface 26 is configured to couple with and implement communications with respect to external devices. Communications interface 26 may provide wired and/or wireless communications. Exemplary embodiments of communications interface 26 comprise electromagnetic transmit and receive circuitry (e.g., radio frequency, infrared, etc.) or other wireless circuitry, USB port, parallel port, or serial port. Communications interface 26 may be embodied in any appropriate configuration to externally communicate electronic data. In one embodiment, configuration device 12 is provided in communication with communications device 14 during communications between communications device and wireless network 16 and accessing service 17. In other embodiments, configuration device 12 may configure communications device 14 and then be removed from communication with device 14.

For configuration device embodiments, storage device 20 may store network access data and service access data to be used to configure communications device 14 to access wireless network 16 and to access service 17. Network access data is arranged to facilitate connection of communications device 14 with wireless network 16 to enable communications. Service access data is arranged to facilitate access between communications device 14 and service 17.

The network access data may be tailored to the associated type of wireless network 16 to be accessed. Exemplary wireless network access data may comprise network identification information of the wireless network 16. Exemplary network identification information includes the network name, or Service Set Identifier (e.g., SSID), which identifies the Extended Service Set (ESS). Network access data may comprise mode of operation information, for example specifying ad hoc peer-to-peer configuration, or infrastructure configuration. Network access data may comprise encryption information corresponding to encryption techniques utilized by wireless network 16, and may include a digital certificate or dynamic key information configured to permit encrypted communications of communications device 14 with wireless network 16. Network access data may comprise any other information configured to facilitate or assist a user with accessing and using wireless network 16.

Service access data may also be tailored to the type of service 17 to be accessed, and/or the location or implementation of the service 17. In one embodiment, service access data may comprise a navigation identifier associated with the service 17. For example, if service 17 comprises a node on wireless network 16, the navigation identifier may comprise an electronic address, such as an Internet Protocol (IP) address, of the service 17. If service 17 is coupled with external network 18 comprising the public Internet, the navigation identifier may comprise a Uniform Resource Locator (URL) of the service 17. Other types of navigation identifiers may be used providing any suitable navigation to service 17.

Service access data may additionally comprise authentication information usable to authenticate access between communications device 14 and service 17 and/or wireless network 16. For exemplary RADIUS authentication, authentication information may comprise a username and a password.

Service access data may also comprise a command to initiate performance of an action of service 17 with respect to communications device 14. For example, the command may automatically cause the loading of a web page associated with service 17 using communications device 14, display devices of service 17 accessible to communications device 14 (e.g., communicate a Universal Naming Convention (UNC) path command to initiate display of shared devices or services accessible to communications device 14, perhaps associated with the username) or provide other desired operations.

Exemplary service access data may include user information corresponding to a user of the communications device 14 and may initiate operations or actions of service 17 applicable and/or tailored to an identified user as identified by the user information (e.g., permit services for which the user has rights). The user information may cause service 17 to perform the action in consideration of the user information (e.g., automatically launch an application of service 17 using a command of the service access data and seed the application using user information of the service access data). Service access data may comprise any other information configured to facilitate or assist a user with accessing and using service 17.

Still referring to FIG. 2, the illustrated exemplary hardware may also comprise communications device 14. However, storage device 20 may store information in addition to the network access data and service access data received from configuration device 12. For example, storage device 20 may comprise an operating system and other applications for use by a user or processing circuitry 22 of communications device 14. Storage device 20 may comprise programming to assist a user with accessing wireless network 16. For example, storage device 20 may comprise programming to detect available wireless networks proximate communications device 14 and to display the options to a user (e.g., Windows XP™ Service Pack 1 available from Microsoft Corporation).

According to exemplary aspects described herein, processing circuitry 22 of the communications device 14 may access the network access data downloaded from configuration device 12, and utilize the information to select one of a plurality of detected wireless networks 16 and use the network access data to establish communications device 14 as a node on the wireless network 16. The processing circuitry 22 may also forward service access data to wireless network 16 to access service 17. Further, the processing circuitry 22 of communications device 14 may also forward commands, user seed information or other information to assist with accessing wireless network 16 and/or service 17. Accordingly, access to wireless network 16 and/or service 17 may be automated without user input. In other aspects, the processing circuitry 22 may request user input (or a user may input information without a request) during the process of accessing wireless network 16 and/or service 17 using respective ones of the network access data and service access data.

Additionally, storage device 20 may comprise programming to process encrypted communications from device 12 in one embodiment. Configuration device 12 may encrypt the network access data and/or service access data in the described exemplary embodiment.

Figure 3:
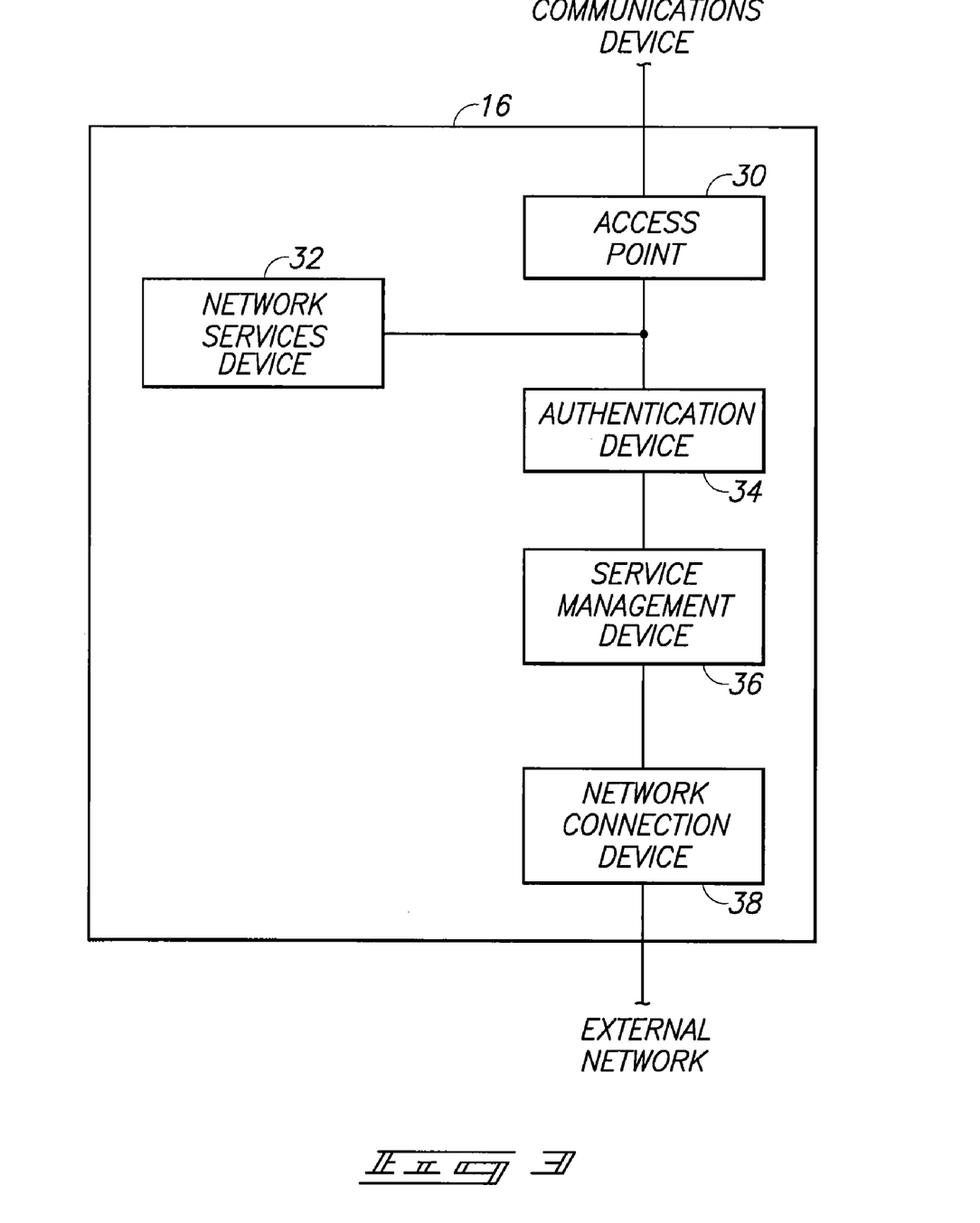
FIG. 3 is a functional block diagram of a wireless network according to one embodiment.

Referring to FIG. 3, an exemplary configuration of wireless network 16 arranged in a service level authentication embodiment is illustrated. The depicted wireless network 16 comprises an access point 30, a network services device 32, an authentication device 34, a service management device 36, and a network connection device 38. Although illustrated as separate devices in FIG. 3, it is possible to implement functions or operations of a plurality of the separate devices within a single device.

Access point 30 comprises a wireless access point in the depicted embodiment configured to provide interfacing between wireless communications (e.g., with communications device 14) and wired devices. In addition, access point 30 may be arranged to control encryption operations (e.g., control management of encryption keys).

Network services device 32 is arranged to dynamically enable communications between nodes of wireless network 16. An exemplary network services device 32 comprises a Dynamic Host Configuration Protocol (DHCP) server configured to assign temporary or permanent electronic addresses to devices coupled with wireless network 16 including communications device 14.

Authentication device 34 is configured to authenticate communications from devices coupled with wireless network 16. In the exemplary service level authentication model of FIG. 3, it is possible for users to communicate with one another via wireless access point 30 without authentication. However, proper authentication is used for communications to external network 18. Accordingly, if the service (not shown in FIG. 3) is implemented using a device coupled with the access point 30, the service may be accessed without authentication. If the service is accessed via the external network 18, proper authentication is used to access the service in the exemplary depicted embodiment. Communications device 14 may communicate authentication information received from configuration device 12 to authentication device 34 for authentication. In one exemplary embodiment, authentication device 34 may be implemented as a RADIUS server and communications device 14 may communicate authentication information comprising a username and a password as described previously.

Service management device 36 is configured to monitor and track usage of service 17 by one or more of communications devices 14. Service management device 36 may be implemented within a server in one embodiment.

Network connection 38 is configured to implement communications intermediate wireless network 16 and one or more external network 18. Network connection 38 may be implemented as a gateway, router and/or firewall in an exemplary embodiment wherein external network 18 comprises the public Internet.

Figure 4:
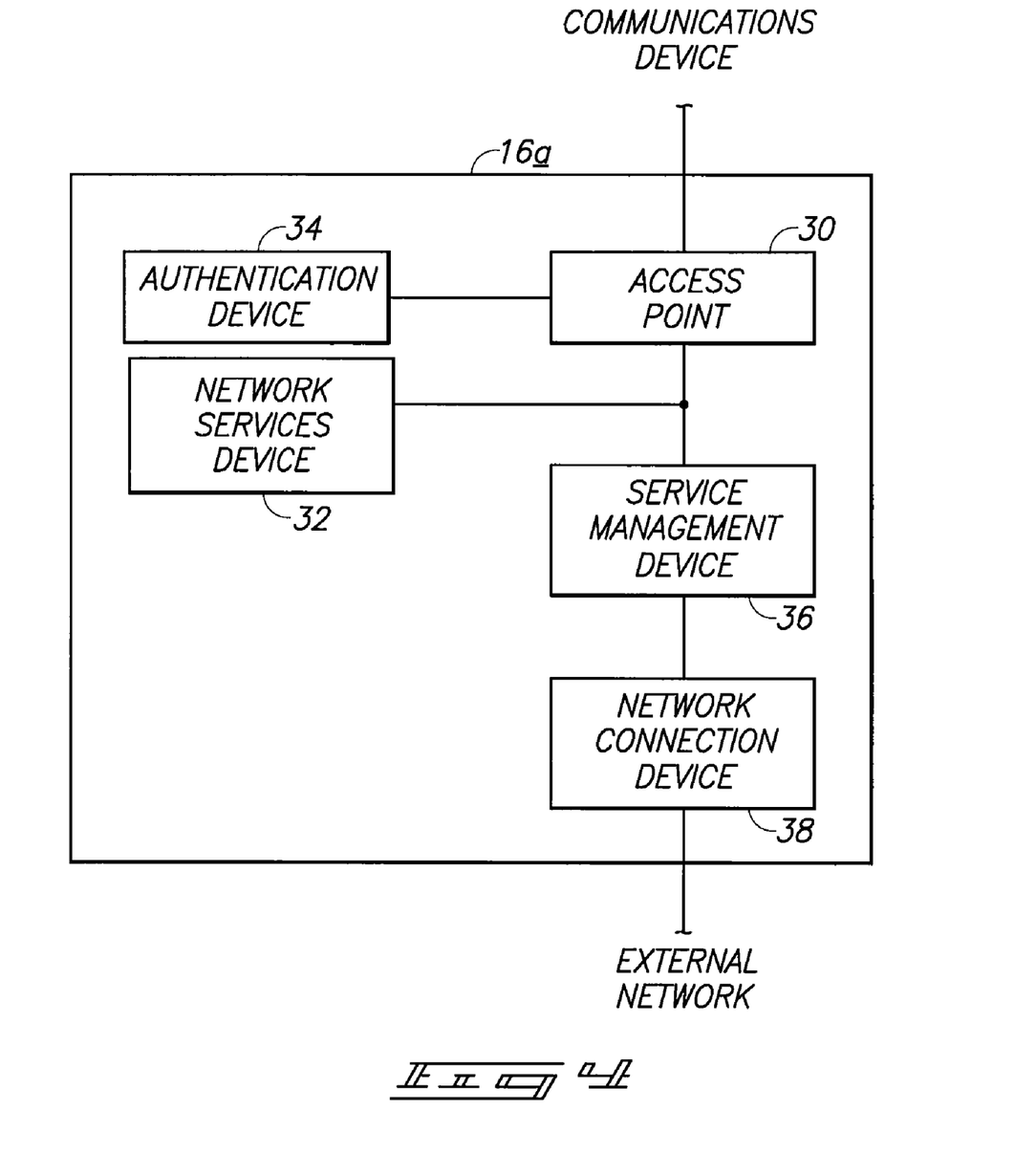
FIG. 4 is a functional block diagram of a wireless network according to another embodiment.

Referring to FIG. 4, an alternate embodiment of wireless network is illustrated with respect to reference 16a wherein like numerals represent like components with differences being represented by a suffix. The exemplary. embodiment of FIG. 4 uses connection level authentication for providing access to the service. Authentication device 34 is coupled with access point 30 and communications device 14 is authenticated before accessing wireless network 16a or external network 18 in the embodiment of FIG. 4. Wireless network 16a may be configured according to standard 802.1x that permits wireless network 16a to scale by allowing centralized authentication of users. In one configuration, 802.1x uses authentication protocol Extensible Authentication Protocol (EAP). EAP messages are encapsulated within 802.1x messages and may be referred to as EAPOL or EAP over LAN. In the described example, access point 30 forwards EAP messages to authentication device 34 (e.g., messages comprising service access data) to authenticate communications device 14 before communications device 14 is given access to wireless network 16 or service 17.

Other configurations of wireless network 16 and/or other configurations for authentication are possible. For example, authentication may be implemented at a remote location of the service 17 (e.g., website supported by the public Internet) instead of within the wireless network 16. For example, the network connection 38 may redirect communications from a communications device 14 to the location of the service 17 for authentication, and if authenticated, the communications may be forwarded from the service 17 to an appropriate destination identified within the communications. Other embodiments are possible for authentication and implementing access to service 17.

Figure 5:
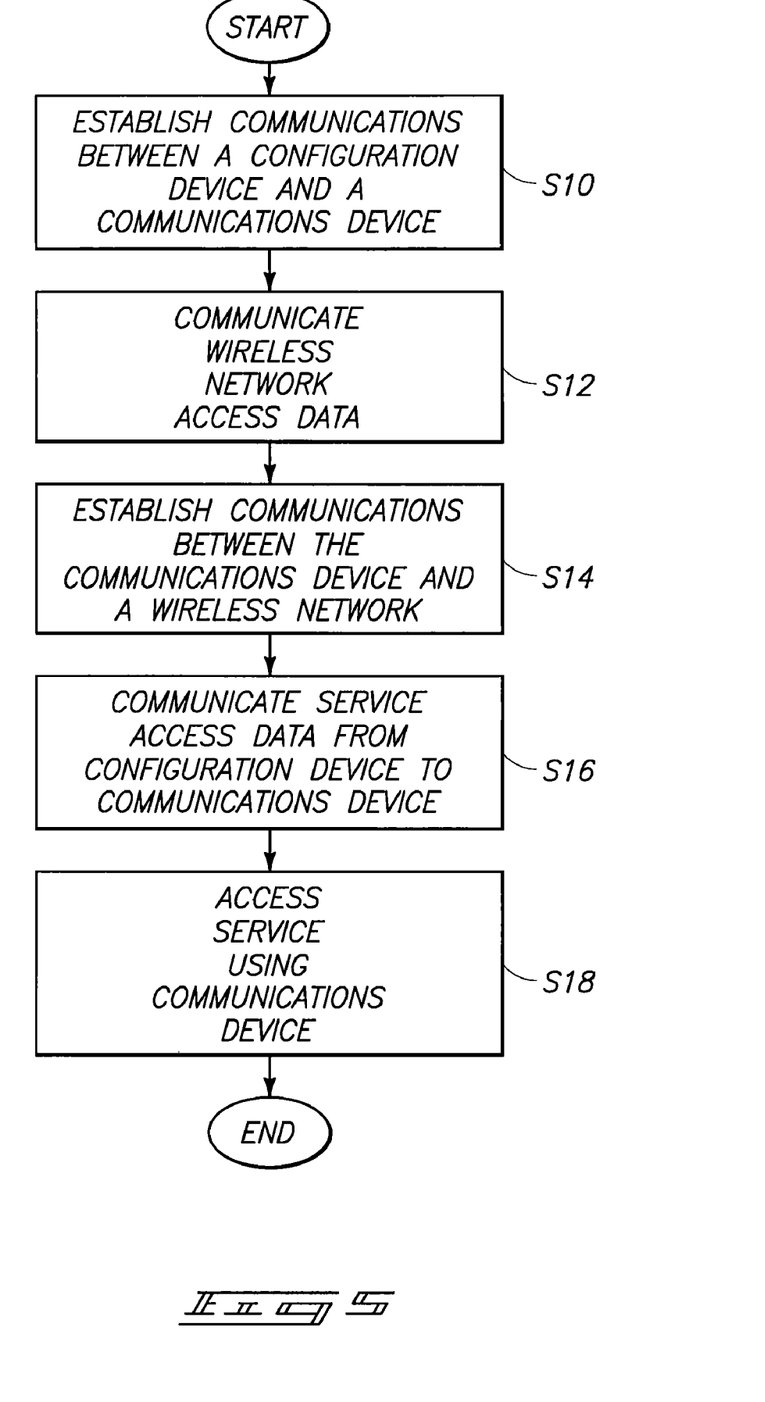
FIG. 5 is a flow chart illustrating a methodology for accessing a service associated with a wireless network according to one embodiment.

Referring to FIG. 5, a methodology illustrating exemplary operations of the configuration device 12, communications device 14 and wireless network 16 for accessing a service 17 are illustrated.

At a step S10, communications are established between the configuration device and the communication device.

At a step S12, the configuration device communicates wireless network access data to the communications device.

At a step S14, the communications device uses the received wireless network access data to establish the communications device as a node on the wireless network and enable communications between the communications device and the wireless network.

At a step S16, the configuration device communicates service access data to the communications device.

At a step S18, the communications device accesses the service associated with the wireless network using the service access data.

In the described example, the communications device may be configured to automatically access the wireless network and/or service using the received respective data from the configuration device and without user input. Other methods are possible including more, less or alternative steps. For example, the communications of steps S12 and S16 between the configuration device and the communications device may be implemented simultaneously in a common step according to another method.

Aspects of the disclosure facilitate configuration of a communications device to access a wireless network, such as a public wireless network, and a service associated with a wireless network. At least some embodiments of the disclosure simplify and condense tasks used to connect to a wireless network and a service available on the network.

The protection sought is not to be limited to the disclosed embodiments, which are given by way of example only, but instead is to be limited only by the scope of the appended claims.

What is claimed is:

1. A wireless communications system comprising:
  a wireless communications device comprising:
    a user interface configured to receive user input and to display information to view by a user of the wireless communications device;
    processing circuitry coupled with the user interface and configured to process the user input received by the user interface and to control the user interface to display the information;
    communications circuitry configured to implement communications of the wireless communications device with respect to a configuration device which is removably received within an externally accessible port of the wireless communication device and to receive wireless network access data and service access data from and stored on the configuration device;
    the processing circuitry is configured to use the wireless network access data to configure the wireless communications device to implement wireless communications via a wireless network from a state where the wireless communications device is incapable of communications via the wireless network; and the processing circuitry is configured to use the service access data to access a service, which is accessible via the wireless network, after the processing circuitry configured the wireless communications device to implement the wireless communications via the wireless network, wherein the processing circuitry is configured to use the wireless network access data and service access data to automatically, and without user input, configure the wireless communications device to implement the wireless communications via the wireless network and to automatically, and without user input, access the service.

2. The system of claim 1 wherein the communications circuitry is configured to receive the wireless network access data and service access data from the configuration device without use of the wireless network.

3. The system of claim 1 wherein the service access data comprises a command configured to initiate an action of the service with respect to the communications device.

4. The system of claim 3 wherein the command is configured to cause the processing circuitry to control a display of a web page of the service using the user interface.

5. The system of claim 3 wherein the service access data comprises user information regarding a user of the wireless communications device, and the command is configured to initiate the action of the service using the user information.

6. The system of claim 5 wherein the command is configured to initiate the action of the service comprising providing access of the user to one portion of the service using the user information and denying access of the user to another portion of the service using the user information.

7. The system of claim 1 wherein the processing circuitry is configured to use the wireless network access data to select the wireless network from a plurality of networks and to establish the wireless communications device as a node on the wireless network.

8. The system of claim 1 wherein the wireless network is coupled with another network which supports the service, and wherein the service access data comprises an address of the another network corresponding to the service.

9. The system of claim 1 further comprising the configuration device comprising:
   storage circuitry which stores the wireless network access data service access data; and
   communications circuitry configured to communicate the wireless network access data and service access data externally of the configuration device to the communications device.

10. The system of claim 9 wherein the configuration device is configured to store information regarding accessing of the service by the wireless communications device.

11. A wireless communications system comprising:
   a configuration device comprising:
      communications circuitry configured to communicate with a wireless communications device upon being plugged into an externally accessible port of the wireless communication device; and
      storage circuitry coupled with the communications circuitry and comprising wireless network access data and service access data, wherein the wireless network access data is provided to configure the wireless communications device to access a wireless network and the service access data is provided to configure the wireless communications device to access a service via the wireless network, wherein the configuration device is configured such that upon being plugged into the externally accessible port of the wireless communication device, the configuration device causes the wireless communication device to automatically and without further user input configure the wireless communications device using the wireless network access data to implement the wireless communications via the wireless network and to automatically, and without user input, access the service using the service access data.

12. The system of claim 11 further comprising the wireless communications device configured to receive the wireless network access data and service access data from the configuration device, to use the wireless network access data to access the wireless network from a state where the wireless communications device is incapable of communications via the wireless network, and to use the service access data to access the service via the wireless network.

13. The system of claim 11 wherein the communications circuitry is configured to establish communications with the wireless communications device from a state where no communications can occur between the wireless communications device and the configuration device.

14. A wireless communications method comprising:
   using a wireless communications device, establishing communications with a configuration device which is removably plugged into an externally accessible port of the wireless communications device;
   using the wireless communications device, receiving wireless network access data and service access data from and stored on the configuration device using the established communications;
   using the wireless network access data, the wireless communications device automatically, and without further user input, establishing wireless communications with respect to the wireless network from a state where the wireless communications device is incapable of communications via any available wireless network;
   after the establishing the wireless communications of the wireless communications device with respect to the wireless network, the wireless communications device communicating the service access data via the wireless network to a service coupled with the wireless network; and
   the wireless communications device, automatically and without further user input, accessing the service as a result of the communicating the service access data via the wireless network to the service.

15. The method of claim 14 further comprising outputting the wireless network access data and service access date externally of the configuration device to the wireless communications device.

16. The method of claim 14 wherein the service access data comprises a command configured to initiate an action of the service with respect to the wireless communications device, and further comprising initiating the action using the command after the receiving the service access data from the configuration device.

17. The method of claim 16 wherein the initiating the action comprises causing the wireless communications device to display a web page of the service.

18. The method of claim 16 wherein the service access data comprises user information regarding a user of the wireless communications device, and the initiating the action comprises launching an application of the service and seeding the application using the user information of the service access data.

19. The method of claim 14 further comprising, using the wireless network access data, the wireless communications device selecting the wireless network from a plurality of possible networks detected by the wireless communications device.

20. A wireless communications system comprising:
  a wireless communications device comprising:
    a user interface configured to receive user input and to display information to view by a user of the wireless communications device;
    processing circuitry coupled with the user interface and configured to process the user input received by the user interface and to control the user interface to display the information;
    communications circuitry configured to implement communications of the wireless communications device with respect to a configuration device which is external of the wireless communications device and to receive wireless network access data and service access data from the configuration device;
  the processing circuitry is configured to use the wireless network access data to configure the wireless communications device to implement wireless communications via a wireless network from a state where the wireless communications device is incapable of communications via the wireless network; and
  the processing circuitry is configured to use the service access data to access a service, which is accessible via the wireless network, after the processing circuitry configured the wireless communications device to implement the wireless communications via the wireless network, wherein the wireless network is coupled with another network which supports the service, and wherein the service access data comprises an address of the another network corresponding to the service, wherein the processing circuitry is configured to use the wireless network access data and service access data to automatically, and without user input, configure the wireless communications device to implement the wireless communications via the wireless network and to automatically, and without user input, access the service.

* * * * *